United States Patent [19]
Reed

[11] Patent Number: 5,379,505
[45] Date of Patent: Jan. 10, 1995

[54] METHOD FOR REPAIRING CRACKS

[75] Inventor: Gary J. Reed, Turlock, Calif.

[73] Assignee: Lock-N-Stitch International, Turlock, Calif.

[21] Appl. No.: 77,854

[22] Filed: Jun. 16, 1993

[51] Int. Cl.$^6$ .............................................. B23P 6/04
[52] U.S. Cl. ................ 29/402.17; 29/402.11; 29/888.011
[58] Field of Search ........... 29/402.11, 402.12, 402.14, 29/402.15, 402.17, 402.01, 402.09, 456, 888.011; 411/1, 2, 3, 5, 411, 412, 424, 426

[56] References Cited

U.S. PATENT DOCUMENTS

| | | | |
|---|---|---|---|
| 154,864 | 9/1874 | Harvey | 411/411 |
| 2,951,506 | 9/1960 | Diperstein | 29/402.12 X |
| 3,660,233 | 5/1972 | Dalke et al. | 411/411 X |
| 4,599,781 | 7/1986 | Diperstein | 29/402.11 |
| 4,662,806 | 5/1987 | Reed | 29/402.17 X |
| 4,824,279 | 4/1989 | Casazza | 29/402.12 X |
| 4,845,828 | 7/1989 | Reed | 29/402.15 |
| 4,892,429 | 1/1990 | Giannuzzi | 411/411 X |

FOREIGN PATENT DOCUMENTS

| | | | |
|---|---|---|---|
| 456481 | 12/1950 | Italy | 411/411 |
| 350141 | 6/1931 | United Kingdom | 411/411 |

*Primary Examiner*—Mark Rosenbaum
*Assistant Examiner*—S. Thomas Hughes
*Attorney, Agent, or Firm*—Bernhard Kreten

[57] ABSTRACT

A pin is provided for repairing cracks in materials such as iron casting materials. The pin includes threads with both upper surfaces and lower surfaces which angle upwards toward a head of the pin. A tapping bit is utilized in a hole of similar diameter to the pin, positioned with half of the hole on each side of a crack, the bit creating threads in the hole which are substantially complemental to the threads of the pin. The pin includes a shoulder which has a greater diameter than a diameter of the hole. A neck is located between the head of the pin and the shoulder of the pin having a lesser diameter than any other portion of the pin. When the pin is threaded into the hole, the shoulder abuts against a surface of the cracked material causing the pin to cease translation into the material. Upon further rotation of the pin, the upwardly angled threads draw opposite sides of the crack towards each other. Before a torsional load can be applied to the pin which would damage the threads, the head shears off at the neck. A threaded portion of the pin thus remains within the hole holding sides of the crack tightly together.

18 Claims, 8 Drawing Sheets

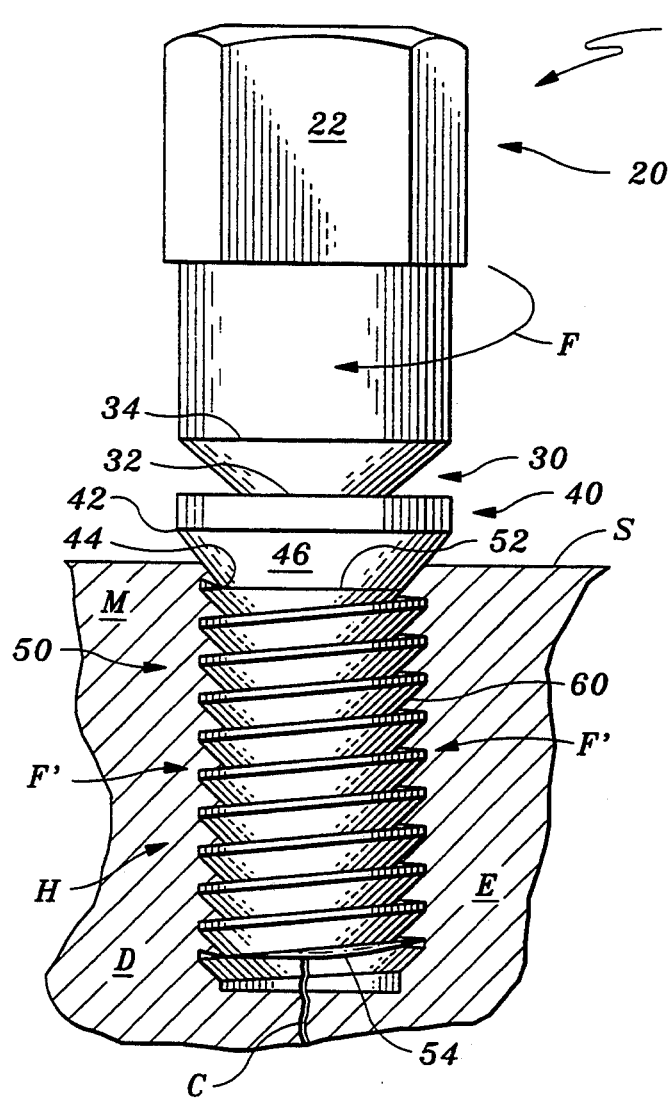
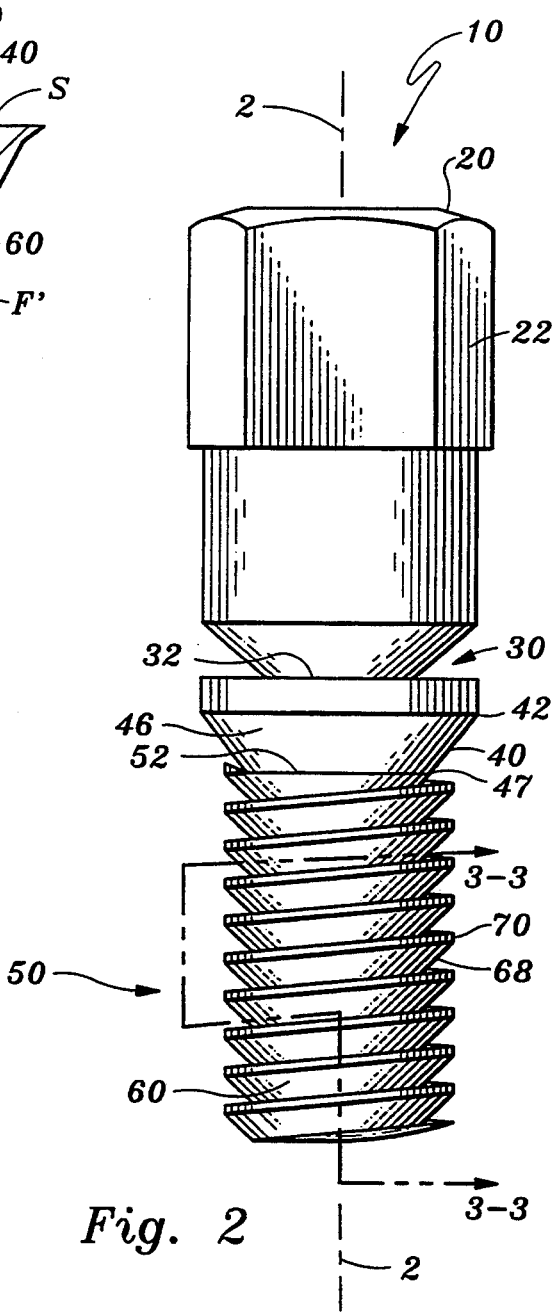
Fig. 1
Fig. 2

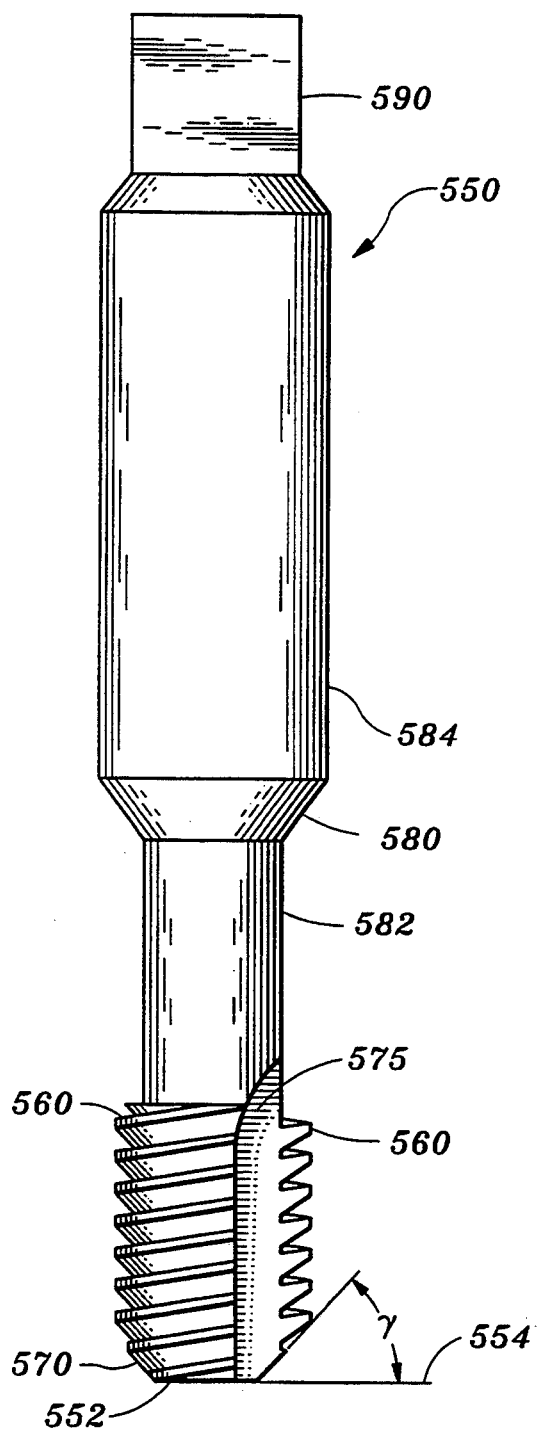
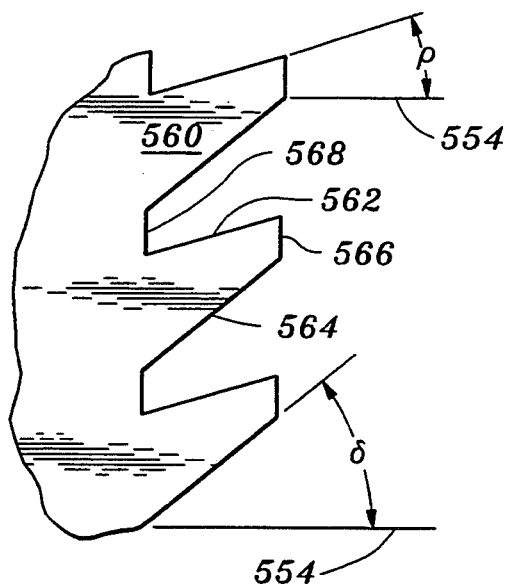
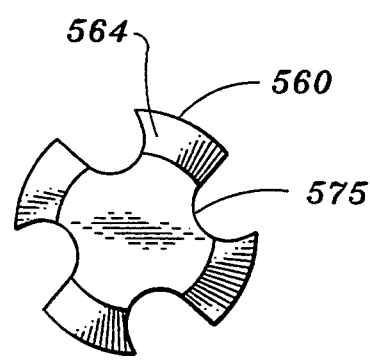
Fig. 5
Fig. 6
Fig. 7

METHOD FOR REPAIRING CRACKS

FIELD OF THE INVENTION

The following invention relates to methods and devices for repairing cracks in materials. More specifically, the present invention relates to methods and devices for crack repair in casted parts by drilling holes in the crack, threading the holes and screwing threaded pins into the holes, especially pins having threads which extend outward away from a central axis of the pin and upward, toward a head of the pin.

BACKGROUND OF THE INVENTION

Materials often exhibit a variety of different failure mechanisms. On occasion, materials are loaded beyond a tensile strength of the material and the material fractures abruptly and completely. In these circumstances the material is usually irreparable and must be replaced. However, often materials do not fall in an abrupt complete manner, but rather fail due to fatigue or localized stresses which exceed design criteria, causing cracks to form in the material. Often when these cracks initially form, the material is still functional for its desired purpose. For instance, a reciprocating machine may receive cracks in its structural material and yet continue to operate, albeit at perhaps a lesser efficiency. Cracks thus serve as indicators that a material is being over stressed and yet also provide an opportunity for remedial measures to be taken without requiring entire replacement of the affected materials.

While crack repair methods have become well known in the art, they have traditionally been looked upon as primarily a temporary or stopgap measure which usually cannot be relied upon to permanently repair a crack-damaged material. Usually "repaired" cracks are still weaker than surrounding material and thus are subject to recracking or other failure in the same location. However, crack repair is attractive in that it can often extend the life of the material without requiring significant downtime for the machinery which utilizes the material. Thus, crack repair can result in the avoidance of significant replacement costs.

Accordingly, a need exists for a method and apparatus for crack repair which can be performed in a low-cost, timely manner and yet repair the crack to a level which makes the material as strong as (or stronger than) it was before the crack occurred.

Crack repair pins or "plugs" have been known in the art which are threaded into holes drilled in the cracks to prevent cracks from continuing to propagate. These "plugs" have also been somewhat effective in resealing materials such as cast iron casings which require that they maintain a somewhat pressurized environment without allowing fluids to escape therefrom.

In addition, locks are known in the art which can draw cracks together somewhat and extend the life of a material which is cracked.

However, neither of these solutions can effectively strengthen the material to a level which makes it stronger than it was before the crack occurred and also effectively seal up the crack to establish a pressure-withstanding seam. The device of this invention, when used in accordance with the method of this invention, includes pins which have threads that angle upward toward the head of the pin. These upwardly angled threads engage with complementally formed threads in holes drilled into the crack. When the pins are advanced into the crack, the upwardly sloped threads draw opposite sides of the crack toward each other. Thus, the crack is actually drawn closed and sealed by the pins located within the crack.

Various devices are known in the art which include threads which extend upwardly. However, none of these threaded devices are configured to include all of the features of the pins of this invention. Furthermore, none of the threaded devices having upwardly sloping threads have been utilized in conjunction with a method for sealing cracks within a material.

SUMMARY OF THE INVENTION

In a preferred form, the pin of this invention includes a head with a means to apply torque thereto, a neck below the head, a shoulder below the neck and a threaded shaft below the shoulder. The head can include any of a variety of torque receiving configurations. For instance, the head can have multiple facets dimensioned to be addressed by facets of a wrench, slots formed complemental to slots of a screw driver, or other similar structure. The head thus receives torque and causes the pin to rotate about a central, long axis thereof.

The neck is interposed between the head and the shoulder and defines an area of the pin having a weakest tensile strength when experiencing torsional loads. Thus, when torque is applied through the head at greater and greater magnitudes, the pin fractures at the neck before fracturing in any other location.

The shoulder is interposed between the neck and the threaded shaft and defines a greater diameter portion. As the pin is threaded into a complementally formed hole, the shoulder abuts against an outer surface of the hole, identifying a point at which the pin can translate no further along the central, long axis.

The threaded shaft is a substantially cylindrical construct having a top adjacent the shoulder and a bottom defining a surface of the pin opposite the head. The threaded shaft has threads circumscribing an outer periphery thereof. The threads include a crest defining a major diameter thereof and a root defining a minor diameter thereof. An upper surface extends from a bottom edge of the root to an upper edge of the crest. A lower surface extends from a top edge of the root to a lower edge of the crest.

The upper surface extends upward linearly from the bottom edge of the root to the upper edge of the crest. Similarly, the lower edge extends linearly upward from the top edge of the root to the lower edge of the crest. Thus, the upper edge of the crest is closer to the head than the adjacent bottom edge of the root.

In mending a crack, holes are drilled such that a central axis of the hole extends between opposite sides of the crack. Each hole is configured such that the diameter and the threads thereof are substantially complemental to the threaded shaft of the pins. However, a major diameter of the hole is slightly greater than a major diameter of the pin. A pin is threaded into the hole by applying torque through the head until the shoulder abuts the surface of the material. At that point, the pin can no longer translate along the central axis and into the material.

Further torque is applied to the head causing the pin to rotate and causing the upper surface of the threads to slide along the complementally formed threads of the hole drawing opposite sides of the hole toward each other and hence opposite sides of the crack toward each other. The application of torque is continued until a maximum torsional force for the neck is reached causing the head to shear off at the neck.

Multiple threaded holes are located along the length of the crack and filled with pins to mend the crack. In addition, locks may first be placed transverse to the crack which fit within complementally formed lock receiving holes having a slightly greater length than the locks. Thus, when the locks are placed within the lock receiving holes, the crack is drawn closed somewhat.

OBJECTS OF THE INVENTION

Accordingly, it is a primary object of the present invention to provide a method for mending a crack in a material by drilling holes in the material and locating threaded pins therein with threads which angle upwards towards a surface of the material.

Another further object of the present invention is to provide a method for mending cracks which draws opposite sides of the crack closer together.

Another further object of the present invention is to provide a method for mending cracks that strengthens the cracked region to an equal or greater strength than surrounding regions.

Another further object of the present invention is to provide a method for mending cracks which totally removes the crack from the material.

Another further object of the present invention is to provide a method for mending cracks which can mend cracks existing in sharply angled casted materials.

Another further object of the present invention is to provide a crack mending pin that has threads which angle upwards toward a head of the pin.

Another further object of the present invention is to provide a mending pin which has a head which is driveable by a commonly available torque applying device.

Another further object of the present invention is to provide a mending pin which has threads which are slightly spaced from each other and maintain a minimum thickness between a root and a crest thereof, providing a durable thread.

Another further object of the present invention is to provide a mending pin designed to enter a complementally formed hole only a finite distance and then to have the opposing sides of the hole drawn toward each other.

Another further object of the present invention is to provide a mending pin which has a necked-down portion which snaps off before threads of the mending pin are damaged.

Another further object of the present invention is to provide tap capable of tapping holes with threads that angle upwards towards a surface of the material in which the hole is drilled.

Another further object of the present invention is to provide a mending pin which is simple and inexpensive to manufacture and yet durable in construction.

Another further object of the present invention is to provide a tap which easily forms threads within a hole, the threads receiving a mending pin which has threads which angle upward toward a head of the pin.

Another further object of the present invention is to provide a method and apparatus for quickly mending cracks in cast machinery without disassembly of components of the machinery.

Another further object of the present invention is to provide a method and apparatus for mending cast machinery that can be performed at the site of the machinery with easily transportable tools.

Viewed from a first vantage point it is an object of the present invention to provide a method for repairing a crack in a material having a surface by forcing opposite sides of the crack together, the steps including: drilling holes through the surface and between opposite sides of the crack, tapping the holes with threads, the threads having a major diameter and a minor diameter, with a top portion of each thread adjacent to the major diameter closer to the surface than any other portion thereof, and threading pins into the holes formed in said drilling step, the pins including a head and threads with a major diameter and a minor diameter with a top portion of each thread adjacent the major diameter closer to the head than any other part thereof; whereby when the pin is threaded into the holes, threads of the pins engage threads of the holes forcing opposite sides of the crack toward each other.

Viewed from a second vantage point it is an object of the present invention to provide a threaded pin for location into a threaded hole that straddles a crack in a material having a surface, the hole including a first curved wall on a first side of the crack and a second curved wall on a second side of the crack, the hole including threads therein with a major diameter and a minor diameter with a portion of each thread adjacent the major diameter closer to the surface than any other portion of the thread, said pin comprising, in combination: a head including a means to transfer torque to the pin, a threaded shaft extending from the head including threads thereon, each thread including a crest defining a major diameter of the threaded shaft and a root defining a minor diameter of the threaded shaft, an upper edge of the crest of each portion of the thread located closer to the thread than a bottom edge of the root above an adjacent portion of the thread, and a means for opposing long axis translation of the pin; whereby when the pin is threaded into the hole, further rotation of the pin forces the first side of the crack and the second side of the crack together.

Viewed from a third vantage point it is an object of the present invention to provide a tapping bit for forming threads in a hole in material, the threads having a major diameter and a minor diameter, each section of the threads being closer to a surface of the material at the major diameter and at adjacent minor diameter, said tapping bit comprising in combination:

a cylindrical body similar in diameter to the hole to be tapped, and teeth extending from this cylindrical body, each tooth having a contour including an upper side, a lower side, and a outer side and spaced vertically from adjacent teeth by an inner side, said inner side and said outer side spaced horizontally at a distance similar to a desired distance between its minor diameter and its major diameter, said upper side and said lower side both higher in elevation adjacent said outer side than adjacent said inner side, whereby the tapping bit carves threads into the hole which extend away from a minor diameter and toward the surface.

These and other objects will be made manifest when considering the following detailed specification when taken in conjunction with the appended drawing figures.

BRIEF DESCRIPTION OF THE DRAWING FIGURES

FIG. 1 is an elevational view of a pin of this invention screwed into a hole in the material being mended, the hole shown in section.

FIG. 2 is a elevational view of the pin of FIG. 1 before threading to the hole of FIG. 1.

FIG. 5 is an elevational view of a taping bit configured to form the threads shown in the hole of FIG. 4.

FIG. 6 is a detail of a portion of the teeth shown in FIG. 5.

FIG. 7 is bottom view of that which is shown in FIG. 5.

FIGS. 8A through 8D reveal steps in the crack repair method of this invention showing the sequence of pin application preferred for mending a crack in a material.

Figure 8A:
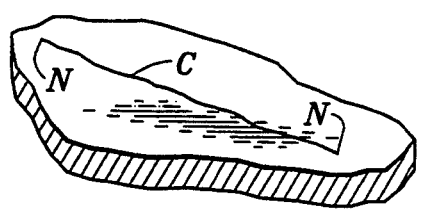
Figure 8B:
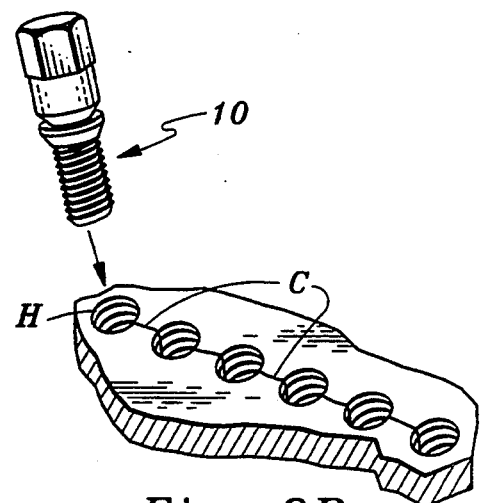
Figure 8C:
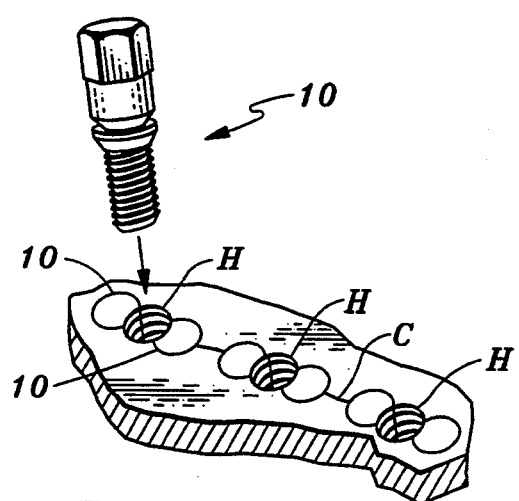
Figure 8D:
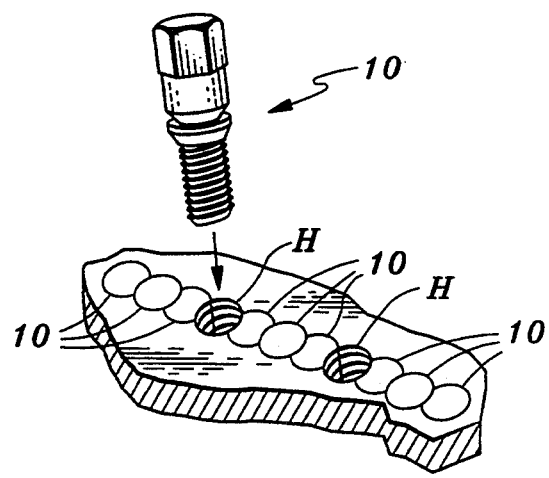
Figure 8E:
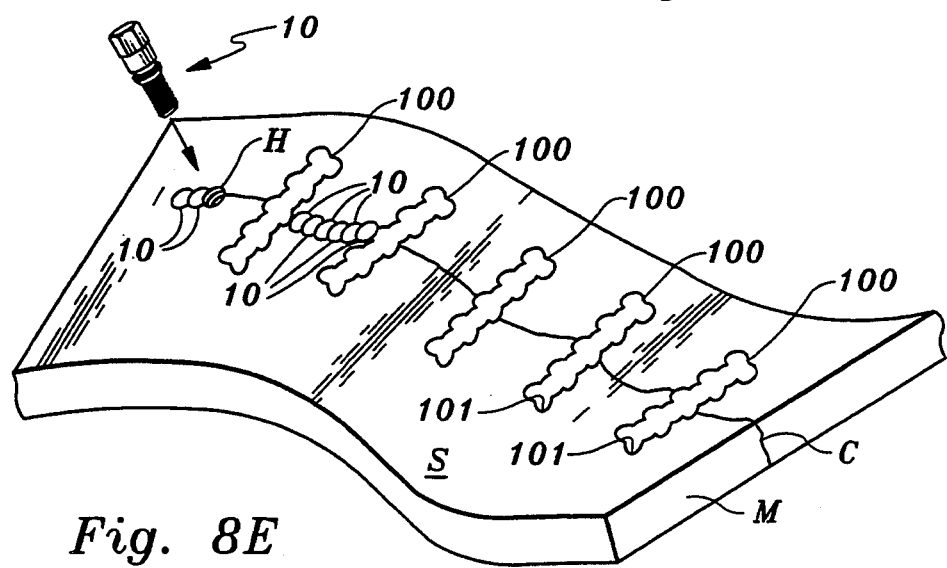

FIG. 8E reveals an alternative crack mending arrangement including locks.

Figure 9:
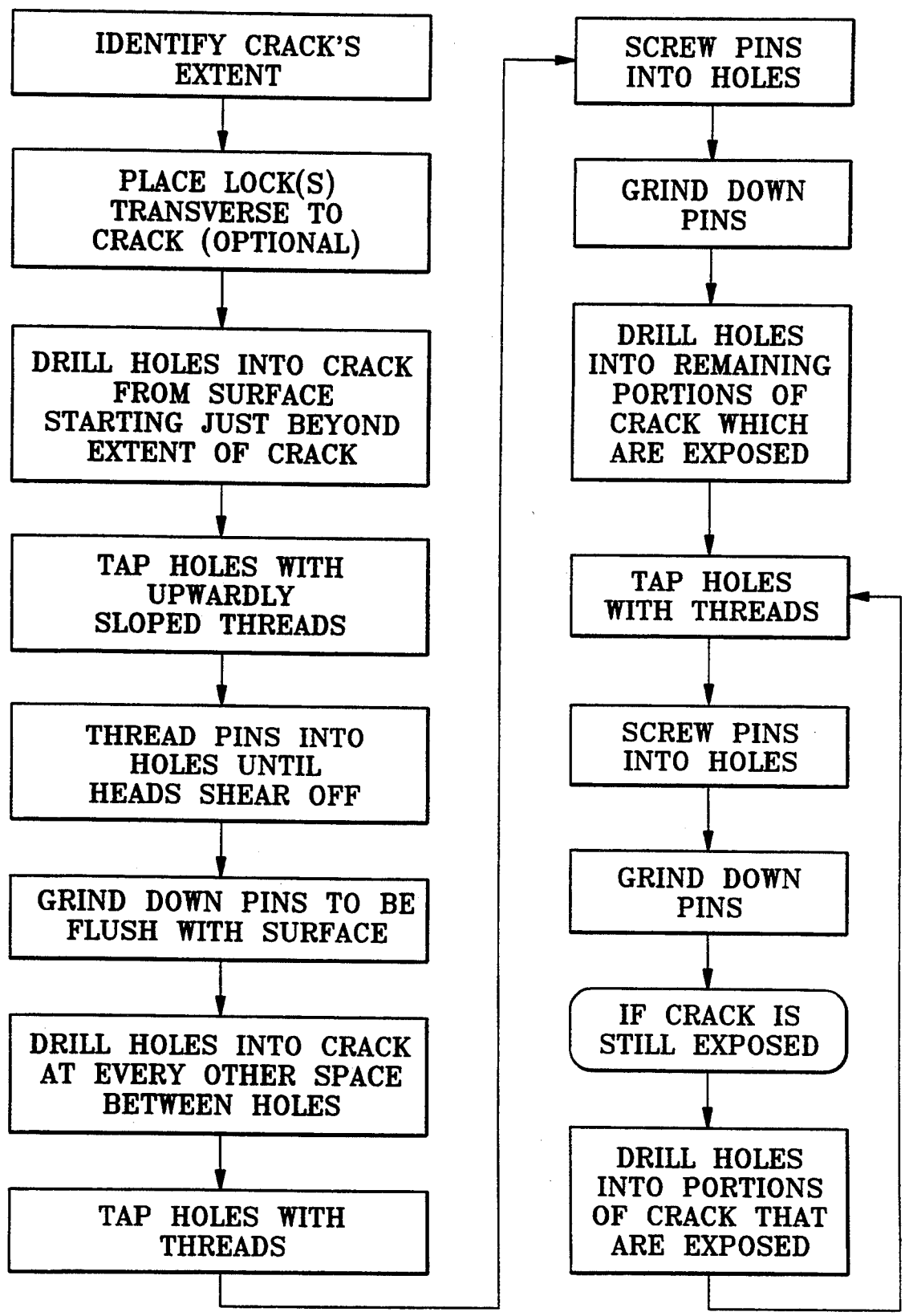

FIG. 9 is a flow chart revealing the steps involved in the method of crack repair of this invention.

Figure 10:
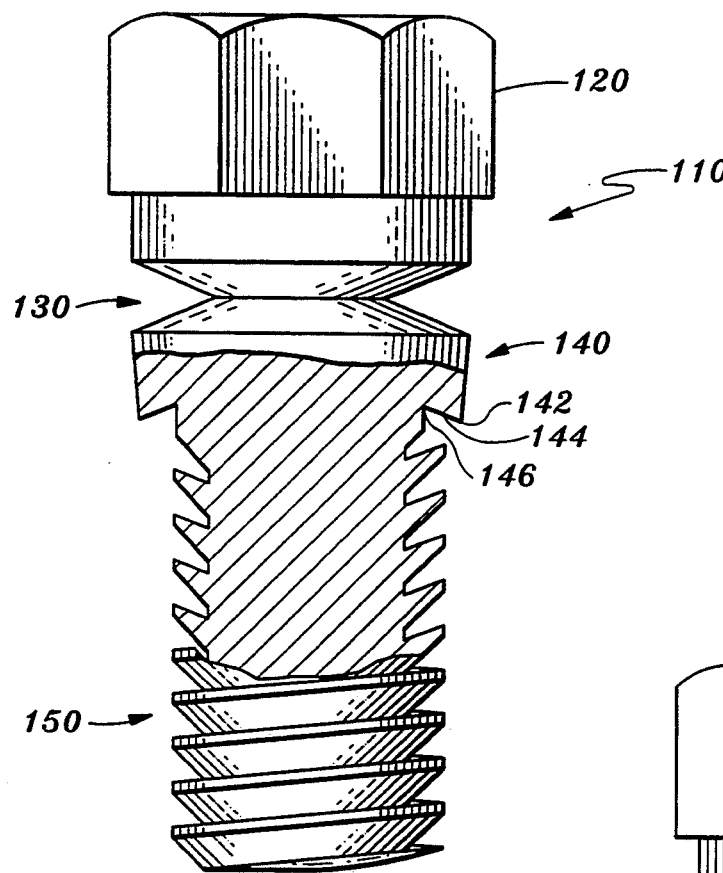

FIG. 10 is an elevational view of an alternative embodiment of that which is shown in FIG. 2 with some features shown in section and some hidden features revealed.

Figure 11:
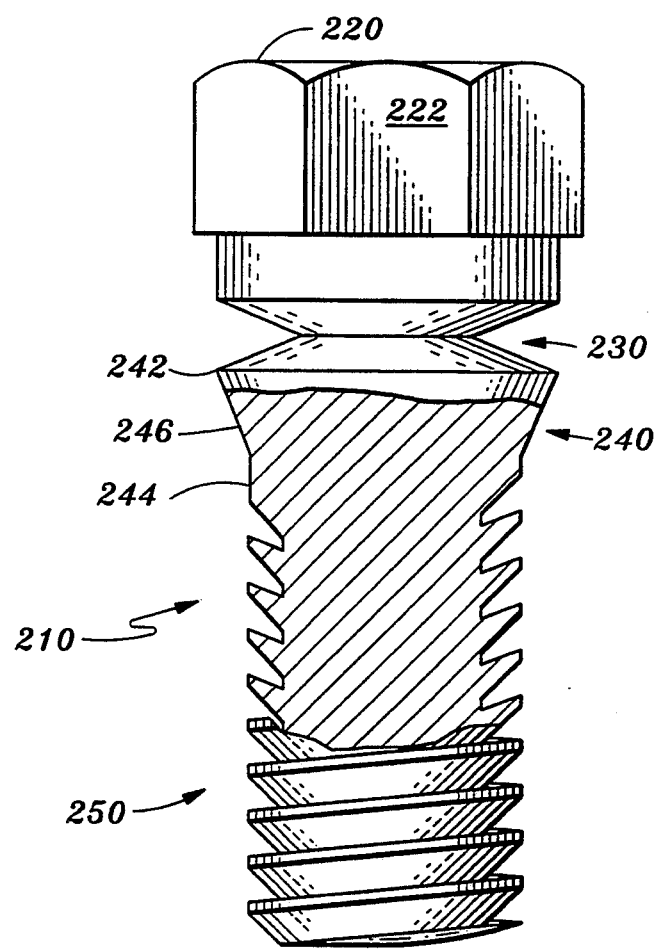

FIG. 11 is an elevational view of an alternative embodiment of that which is shown in FIG. 10 with some hidden features revealed.

Figure 12:
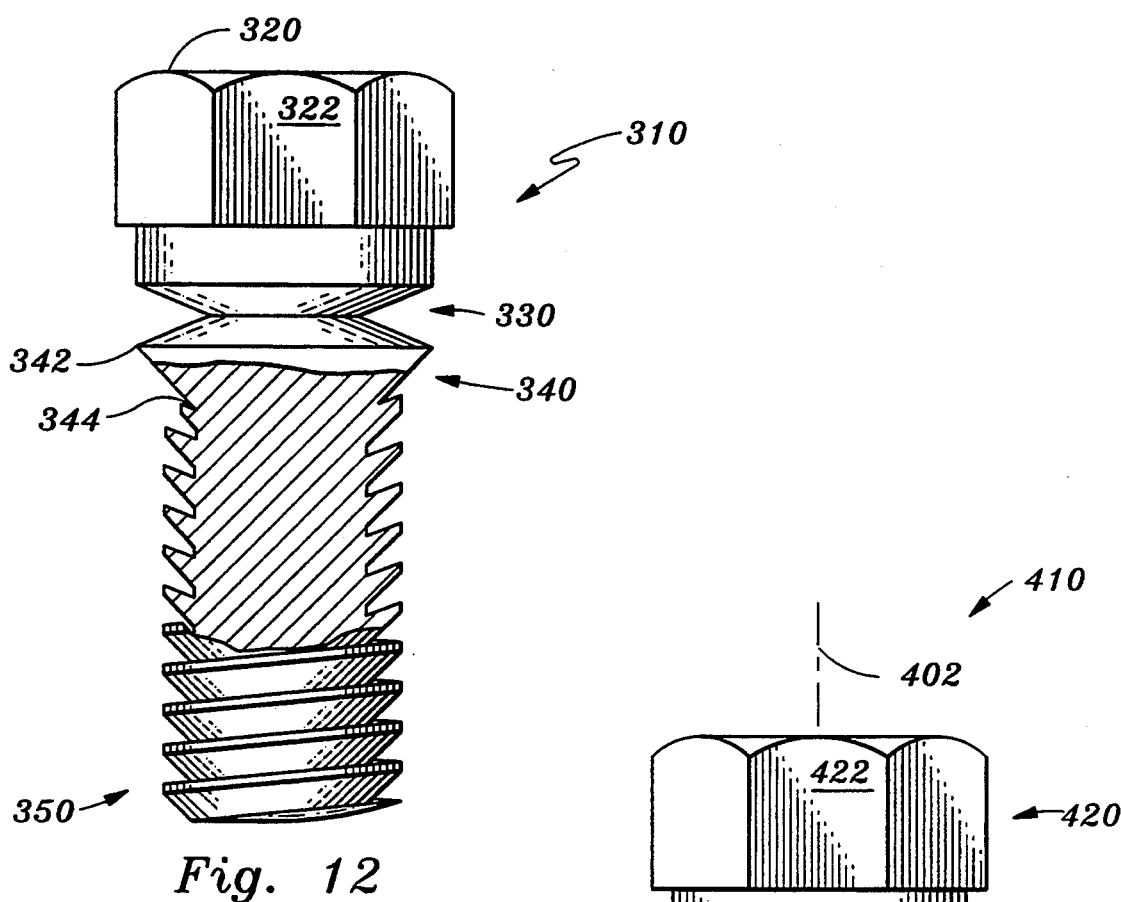

FIG. 12 is an elevational view of an alternative embodiment of that which is shown in FIG. 10 with some hidden features revealed.

Figure 4:
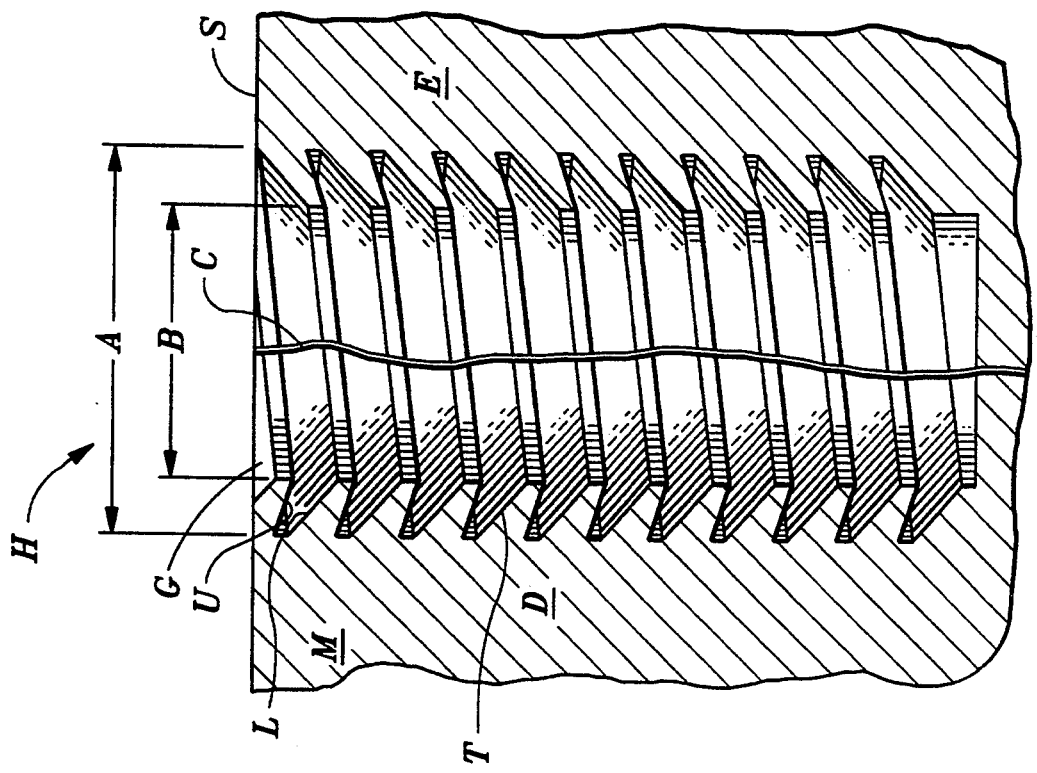
FIG. 4 is a sectional view of the hole shown in FIG. 1.
Figure 3:
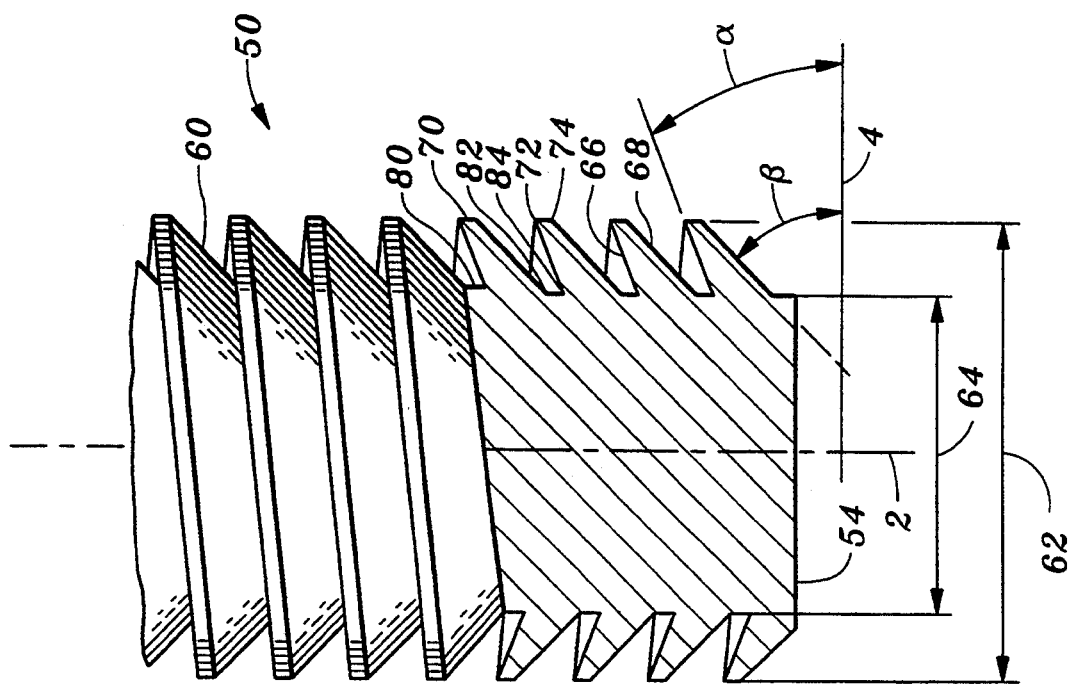
FIG. 3 is a partial section detail view of the pin of FIG. 2 taken along the line 3—3 of FIG. 2.
Figure 13:
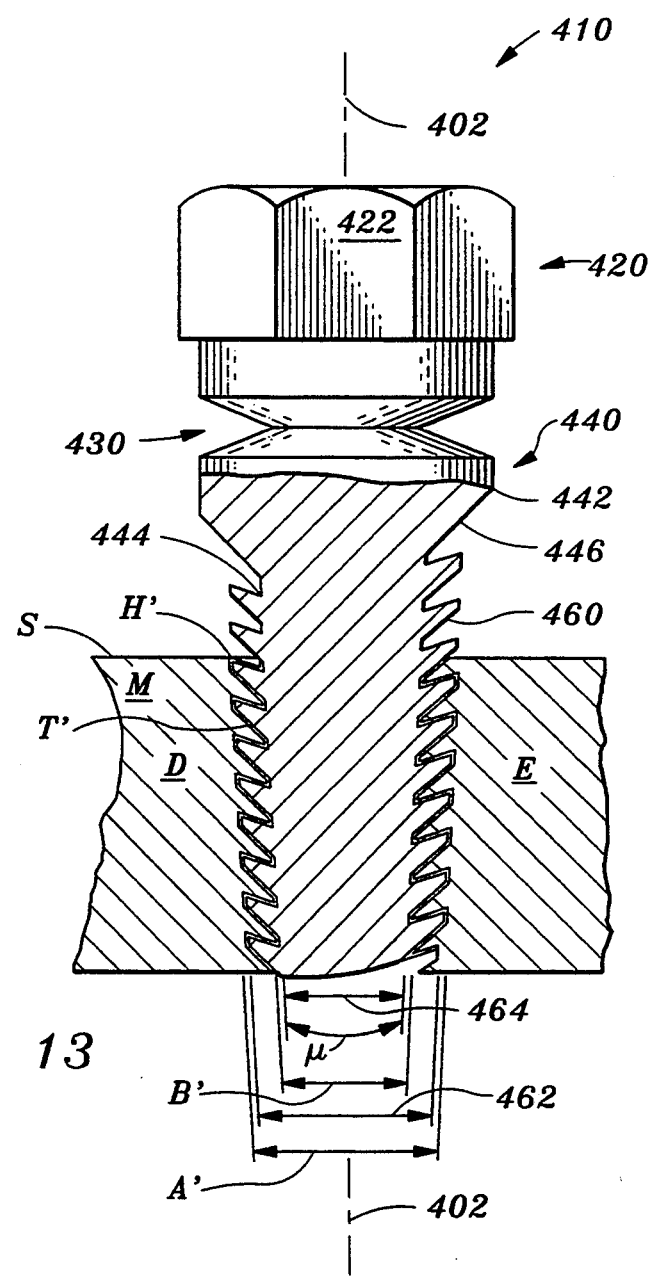

FIG. 13 is a sectional view of an alternative embodiment of that which is shown in FIG. 2 in place within a hole which is an alternative embodiment of the hole shown FIG. 4.

Figure 14:
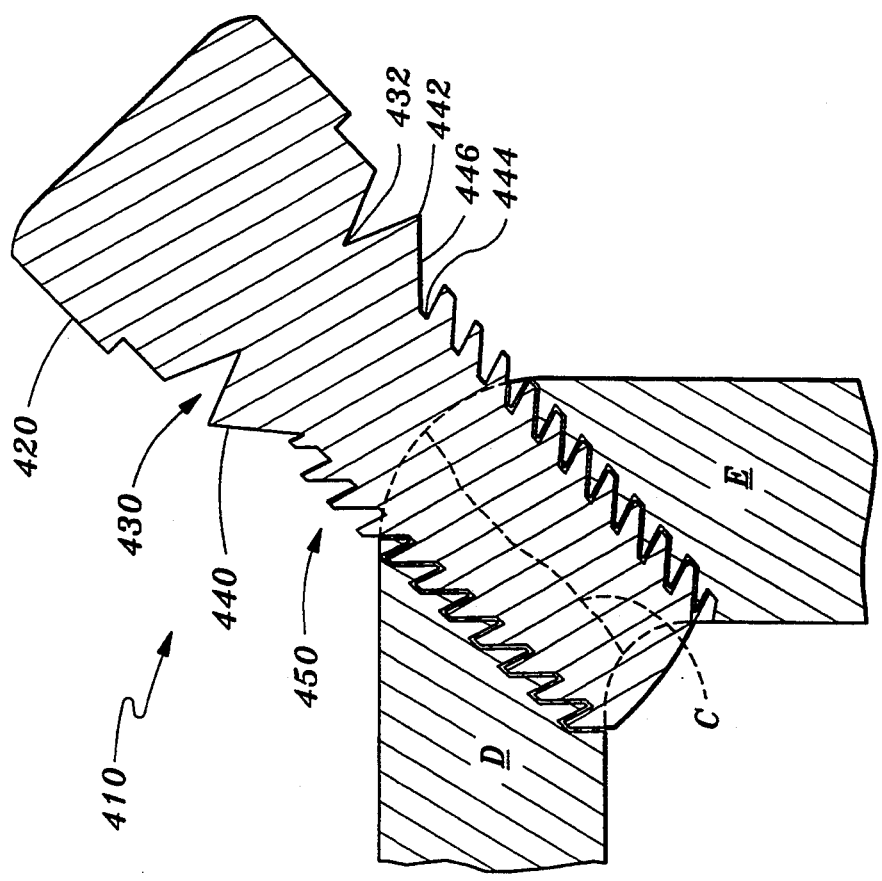

FIG. 14 is a schematic view of the pin of FIG. 14 revealing how the pin of FIG. 14 would mend a crack in a corner of a material.

Figure 15:
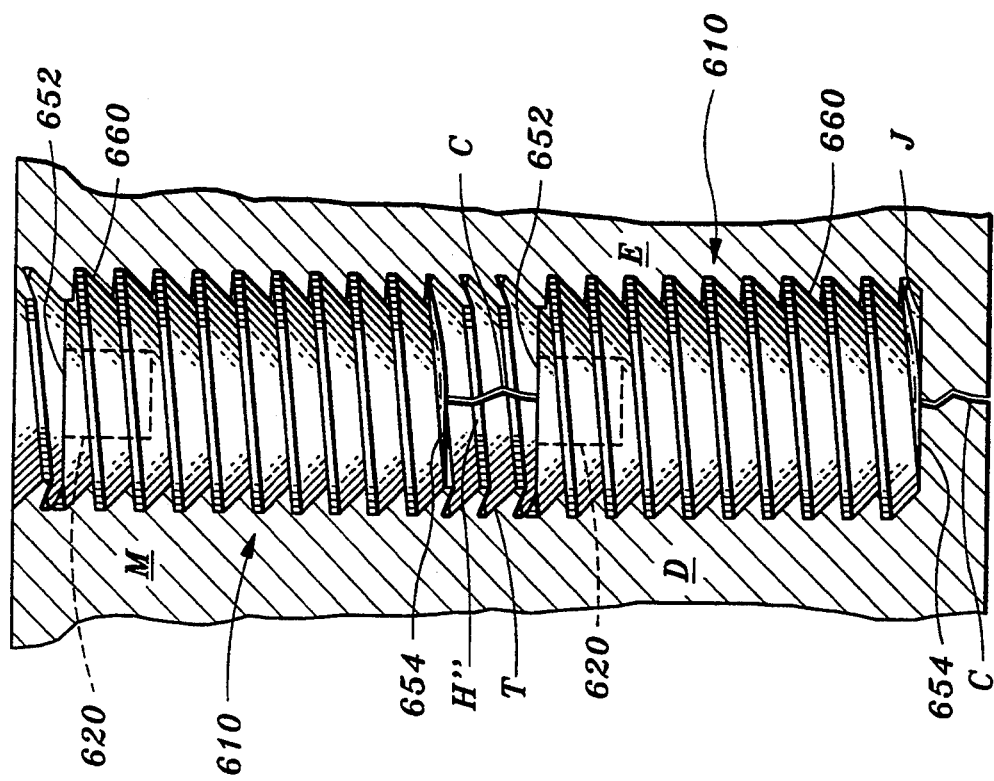

FIG. 15 is an elevational view of a series of pins, representing an alternative embodiment of this invention, within a hole shown in section.

DETAILED DESCRIPTION OF PREFERRED EMBODIMENTS

Referring to the drawings wherein like reference numerals represent like parts throughout, reference numeral 10 (FIG. 1) is directed to a pin for repairing a crack C in a material M. The pin 10 is threaded into a hole H drilled into the crack C and utilizes upwardly directed threads 60 to draw opposite sides of the crack C toward each other, thus strengthening and sealing the material M surrounding the crack C.

In essence, and referring to FIGS. 1 through 4, the pin 10 includes a head 20 at an uppermost portion thereof, a neck 30 below the head 20, a shoulder 40 below the neck 30 and a threaded shaft 50 extending below the shoulder 40. The threaded shaft 50 includes threads 60 thereon which include an upper surface 66 and a lower surface 68 (FIG. 3) which extend upward toward the head 20 from a minor diameter 64 to a major diameter 62. Thus, a crest 70 of each thread 60 is closer to the head 20 than a portion of the thread 60 between adjacent roots 80 at the minor diameter 64.

The hole H (FIG. 4) is drilled into the material through a plane which is coincident with an exposed portion of the crack C. The hole H is threaded with threads T by a tapping bit 550 (FIGS. 5 through 7) which causes the threads T to be substantially complemental to the threads 60 of the pin 10. The threads T of the hole H thus are closer to a surface S of the material M at a major diameter A of the threads T than at a minor diameter B of the threads T.

The head 20 is coupleable to a torque applying instrument which can thread the pin 10 into the hole H. The shoulder 40 has a greater diameter portion 42 which has a diameter greater than a diameter of the threaded shaft 50. When the threaded shaft 50 has been screwed entirely into the hole H, the greater diameter 42 of the shoulder 40 abuts against the surface S of the material M. This abutment prevents the pin 10 from translating along a central long axis 2 any deeper into the hole H.

Upon further rotating of the pin 10, the upper surface 66 of the threads 60 engage the threads T of the hole H forcing a first curved wall G of the hole H on one first side D of the crack C toward a second curved wall I of the hole H on a second side E of the crack C. The first side D and the second side E of the crack C are thus drawn toward each other.

The neck 30 includes a necked down crease 32 which fractures, shearing the head 20 off of the pin 10 when a magnitude of torque applied to the pin 10 reaches a maximum torque to be applied to the threads 60. Thus, the neck 30 prevents the threads 60 from being overly stressed torsionally.

More specifically, and referring in detail to FIGS. 1 through 4, the pin 10 and associated hole H are shown in detail. The pin 10 includes the head 20 at an uppermost end thereof. The head 20 preferably includes multiple facets 22 arranged to allow a torque applying device to effectively engage the head 20. Preferably, the facets 22 are arranged in a hexagonal pattern to be engaged by a variety of commonly available torque applying tools. Alternatively, various other facet arrangements could be utilized or slots such as those receiving a screw driver or other tool could also be used. The head 20 is preferably radially symmetrical about a central axis 2 passing through the pin 10.

The neck 30 joins the head 20 to the shoulder 40. The neck 30 is preferably arranged as a single frustum with a greater diameter base 34 adjacent the head 20 and a lesser diameter crease 32 adjacent the shoulder 40. The crease 32 and base 34 thus define parallel planes of the frustum of the neck 30. The crease 32 is preferably designed to have a cross-sectional area which is less than a cross-sectional area of any other portion of the pin 10. Thus, when torsional loads increase, the pin 10 is most likely to fracture at the crease 32 than at any other location along the pin 10.

In addition, the crease 32 is preferably provided with a cross-sectional area which gives the crease 32 a maximum torsional load characteristic which is less than a torsional load necessary to cause damage to the threads 60 of the threaded shaft 50. In this way, if torsional loads on the pin 10 begin to approach a level which could cause damage to the threads 60 of the threaded shaft 50, the crease 32 of the neck 30 will fracture before a thread 60 damaging load is reached.

The shoulder 40 includes a greater diameter portion 42 directly adjacent the crease 32 of the neck 30. The greater diameter 42 of the shoulder 40 preferably has a greater diameter than a major diameter 62 of the threads 60. The greater diameter 42 also preferably has a greater diameter than a major diameter A of the hole H.

The greater diameter 42 transitions to a lesser diameter 44 of the shoulder 40 directly adjacent a top 52 of the threaded shaft 50. A frustum 46 is formed between the greater diameter 42 of the shoulder 40 and the lesser diameter 44 of the shoulder 40. This frustum 46 is somewhat irregular adjacent the lesser diameter 44 in that it transitions into the top 52 of the threaded shaft 50 where the helically wound threads 60 terminate. The shoulder 40 abuts against the surface S of the material M surrounding the hole H when the pin 10 is threaded into the hole H a sufficient distance along the central axis 2. Further threading of the pin 10 into the hole H causes the shoulder to be wedged into the hole H somewhat and between the first side D and second side E. The shoulder 40 prevents the pin 10 from translating into the hole H beyond a finite amount. The shoulder 40 thus causes the threads 60 of the pin 10 to draw the first side D and second side E of the crack C toward each other, rather than the threads 60 drawing the pin 10 further into the hole H along the central axis 2. The shoulder 40 thus acts to redirect forces applied between the pin 10 and the hole H.

The threaded shaft 50 is a substantially cylindrical construct which extends from the lesser diameter 44 of the shoulder 40 at a top 52 thereof to a bottom 54 which defines an opposite end of the pin 10 from the head 20. The threaded shaft 50 is oriented about the central axis 2 with the central axis 2 passing through a geometric center of the threaded shaft 50. The threaded shaft 50 has threads 60 formed about the cylindrical surface thereof.

The threads 60 are actually one continuous helically wound thread which begins at the bottom 54 and spirals up to the top 52. While this single thread design is preferred, other arrangements including compound series of threads which wind helically together from the bottom 54 to the top 52 could also be utilized.

The threads 60 include a crest 70 defining a major diameter 62 of the threads and a root 80 defining a minor diameter 64 of the threads 60. As shown in detail in FIG. 3, the threads 60 have an upper surface 66 which extends from a bottom edge 84 of the root 80 to the upper edge 72 of crest 70. The threads 60 also include a lower surface 68 which extends from a top edge 82 of the root 80 to a lower edge 74 of the crest 70. Both the upper surface 66 and lower surface 68 angle upwards toward the head 70 as the surfaces 66, 68 extend from the root 80 to the crest 70. Both the crest 70 and root 80 exhibit a constant distance from the central axis 2 between the upper edge 72 and lower edge 74 and between the top edge 82 and the bottom edge 84.

In section, the surfaces 66, 68 extend linearly from the root 80 to the crest 70. However, as this contour is rotated helically about the threaded shaft 50 along with the threads 60, the upper surface 66 and lower surface 68 take on a curved surface appearance. This appearance is similar to that which would be formed by a linear section of the surface of a cone with a tip of the cone oriented downward and the cone rotated and translated upward along a central axis thereof. The upper surface 66 and lower surface 68 thus have a curved surface in three dimensions similar to that of a cone, but a linear character when viewed in section.

The upper surface 66 extends from the root 80 to the crest 70 at an upper surface angle $\alpha$ diverging from a reference plane 4 orthogonal to the central axis 2. The upper surface angle $\alpha$ is preferably 20° but could be any angle between 0° and 90°. The lower surface 68 extends from the root 80 to the crest 70 at a lower surface angle $\beta$ with respect to the reference plane 4. The lower surface angle $\beta$ is preferably 40° but could vary between 0° and 90°.

The upper surface angle $\alpha$ is preferably less than the lower surface angle $\beta$ such that a thickness of the threads 60 at the crest 70 is less than a thickness of the threads 60 between adjacent roots 80. In this way, the threads 60 are provided with greater thickness, and hence greater strength adjacent the minor diameter 64 than at the major diameter 62 and are thus more capable of bearing the loads experienced within the hole H.

Referring now to FIG. 4, details of the hole H are shown. The hole H is preferably substantially complemental in form to the threaded shaft 50 of the pin 10. The hole H includes threads T which include a major diameter A and a minor diameter B. Each thread T includes a lower surface L and an upper surface U. The hole H includes a first curved wall G on the first side D of the crack C and a second curved wall I on the second side E of the crack C. The hole H is thus bisected by the crack C.

The hole H is preferably located so that the crack C divides the hole H into two substantially equal portions. Thus, the hole H is oriented to extend along a line which approximates the direction of orientation of the crack C with respect to the surface S. Preferably, the hole H extends to the crack C from the surface S down to a location where the crack C stops. However, the hole H can stop short of a full depth of the crack C (as shown in FIGS. 1 and 4) when pins 10 of sufficient length are not available or when a hole H of shorter depth is sufficient to receive a pin 10 that can effectively support all of the crack C.

The threads T of the hole H are shaped to have surfaces L, U which conform to the upper surface 66 and lower surface 68 of the threads 60 of the pin 10. However, a major diameter A of the hole H is preferably slightly greater than a major diameter 62 of the threads 60 and the minor diameter B of the threads T are preferably slightly greater than a minor diameter 64 of threads 60.

This slight disparity provides a tolerance between the pin 10 and hole H for ease of fitting of the pin 10 into the hole H. Furthermore, this provides a finite amount of travel between the first curved wall G and the second curved wall I of the hole H when the pin 10 is tightened into the hole H, causing the first side D and second side E of the crack C to be drawn toward each other. Thus, the major diameter A and minor diameter B of the hole H are initially greater than the major diameter 62 and minor diameter 64 of the threads 60. After tightening the pin 10 into the hole H, this difference between the hole H and the threaded shaft 60 is reduced or eliminated.

FIGS. 5 through 7 show details of the tapping bit 550 preferably used to form the hole H. The tapping bit 550 is preferably a substantially cylindrical construct having a torque input head 590 at one end thereof and a bottom 552 on an opposite end thereof. A stop 580 defines a transitional region between a lesser diameter 582 and a greater diameter 584 portion of the tapping bit 550. The stop 580 is located a distance from the bottom 552 equal to a desired depth of the hole H to be formed by the tapping bit 550. The lesser diameter 582 of the tapping bit 550, below the stop 580, is preferably substantially similar to a diameter of the hole H before threading thereof with the threads T.

A plurality of teeth 560 are oriented proximate to the bottom 552 which extend helically around the tapping bit 550 at an angle similar to an angle of the threads T within the hole H. The teeth 560 include an upper side 562, a lower side 564, an outer side 566 and an inner side 568. Each of the teeth 560 is interrupted by a cutout groove 575 which prevents the teeth 560 from forming one continuous tooth extending along the tapping bit 550. The cutout groove 575 allows filings cut out of the hole H by the tapping bit 550 to escape from the teeth 560 and allow the teeth 560 to cut the threads T into the hole H without obstruction.

The teeth 560 are shaped with an upper side 582, lower side 564, outer side 586, and inner side 568. These sides 562, 564, 566, 568 are dimensioned in a manner similar to the threads T of the hole H. As noted above, the threads 60 of the pin 10 are slightly smaller in major diameter 62 and minor diameter 64 than the threads T of the hole H and thus, the teeth 560 are slightly larger in dimension than surfaces 66, 68 of the pin 10.

The upper sides 562 of each of the teeth 560 are oriented at an angle from a reference plane 554 orthogonal to a long axis of the tapping bit 550 at upper side angle $\rho$. The lower side 564 is angled at a lower side angle $\delta$ with respect to the reference plane 554. The lower side angle $\delta$ and upper side angle $\rho$ are preferably similar to the lower surface angle $\beta$ and upper surface angle $\alpha$ respectively.

A portion of the teeth 560 directly adjacent to the bottom 552 are beveled at a bevel 570 having a bevel angle $\gamma$ of preferably 60°. This bevel 570 allows the teeth 560 to cut the thread T into the hole H in progressively greater amounts as the tapping bit 550 initially enters the hole H. While the tapping bit 550 is preferably utilized to form the threads T within the hole H, other bits and other methods of forming threads may be utilized to form the threads T within the hole H.

In forming the threads T within the hole H, the tapping bit 550 is oriented overlying hole H and is coupled to an appropriate torque applying device, such as a drill. The bit 550 is then lowered into the hole H with the bottom 552 entering the hole H. As the tapping bit 550 is lowered into the hole H the threads T are cut into the first curved wall G and the second curved wall I of the hole H.

In use and operation and referring to FIGS. 8A through 8E and FIG. 9, the pin 10 is preferably utilized in conjunction with other similar pins 10 in the following manner to mend a crack C within a material M. Initially, a user identifies the location and extent of the crack C. The crack C includes ends N defining an extent of the crack C along the surface S. Once the crack C has been fully identified, locks 100 may be optionally placed transverse to the crack C such as those disclosed in detail in U.S. Pat. No. 4,662,806 (see FIG. 8E). These locks 100 act to draw opposite sides of the crack C toward each other and to prevent the crack C from widening during the mending process. Each lock 100 is driven into a complementally formed, but slightly longer, lock receiving hole 101

Holes H are then drilled into the crack C along the length of the crack. The holes H preferably extend slightly beyond a visible extent of the crack C at each end of the crack C. This ensures that the entire crack C is included in the mending process. The holes H are spaced a distance apart slightly less than a diameter of each hole H.

The holes H are then tapped with threads T so that they take on an appearance such as that shown in FIG. 4. Once all of the holes H have been threaded, the pins 10 are threaded into the holes H. Preferably, the pins 10 are threaded into the holes H until the heads 20 thereof shear off at the neck 30. This ensures that the pins 10 have been fully tightened into the holes H. An appropriate grinding tool is then used to grind down the remainder of each pin 10 to be flush with the surface S.

While the crack mending procedure could be complete at this point, preferably holes are drilled into the crack C in between where pins 10 have already been placed (note that this can require that portions of pins 10 may need to be drilled out). Rather than drill holes H into every space between the pins 10 that have already been located into the crack C, holes H are drilled at every other gap between already located pins 10. Once these holes H are fitted with pins 10, remaining gaps between rifled holes H are drilled to make holes H with pins 10 that are threaded thereinto.

Drilling of the holes H thus occurs in three stages. A first stage drills holes H at each end N of the crack C and every other hole H location that will eventually be drilled. A second stage drills holes H at any other gap along the crack C between adjacent holes H of the first stage. A third stage drills holes H at every remaining gap along the crack C between adjacent holes H.

Once the final portions of the crack C have been provided with holes H, all of the crack C visible upon the surface S will have been drilled out and incorporated into a portion of a hole H and threaded with a pin 10. However, at no time during the mending process will two holes H have been formed and not filled with pins 10 that are adjacent to each other and overlap each other.

In this way, each pin 10 fitted within the holes H is maintained with at least three-quarters of a circumference thereof in active engagement with the material M, insuring that the threads 60 of the pins 10 will not separate from the threads T of the hole H within the material M. The pins 10 are then ground down to be flush with the surface S leaving a surface S with no visible cracks C and only revealing a region where a series of pins 10 and, optionally locks 100 have been imbedded into the material M.

Referring again to FIG. 1, details of the exact mechanism of crack C closure are described. As the pin 10 is threaded into the hole H, rotation of the pin 10 causes a force F to be exerted between the threads 60 and the threads T of the hole H. This rotational force F is counteracted through the threads 60, T, causing the pin 10 to migrate downward into the hole H. When the pin 10 has entered the hole H a sufficient distance to cause the shoulder 40 to abut the surface S surrounding the hole H, this vertical downward response of the pin 10 to the rotational force F is halted.

However, continued force F applied rotationally to the pin 10 continues to cause the upper surface 66 of the threads 60 to engage the upper surface U of the threads T of the hole H. This continued force, rather than drawing the pin 10 downward vertically along the central axis 2, exerts a force F' against the material M on each side of the hole H tending to draw the first curved wall G and the second curved wall I toward each other. This closing force F' causes the first side D and second side E of the crack C to be drawn toward each other. In this way, the pins 10 and also the pins 110, 210, 310, 410 draw the first side D and second side E of the crack C toward each other, thus mending the crack C.

Referring now to FIG. 10, an alternative embodiment of the pin 10 is shown. Pin 110 is similar in form to the pin 10 except that the shoulder 140 of the pin 110 does not include a frustum 46 (see FIG. 2) but rather includes a cusp 144. The cusp 144 is formed by a greater diameter portion 142 and a lesser diameter portion 146, with the lesser diameter portion 146 adjacent the threaded shaft 150 yet closer to the head 120 than the greater diameter portion 142. This pin 110, when screwed into the hole H has the cusp 144 address the surface S surrounding the hole H and preferably impregnates the surface S somewhat. Thus, the shoulder 140 fits tightly into the surface S surrounding the hole H before the head 120 snaps off at the neck 130.

Referring now to FIG. 11, an alternative embodiment of the pin 10 is shown. This pin 210 includes a head 220 with facets 222 thereon above a neck 230 which extends to a shoulder 240 which in turn is connected to a threaded shaft 250. The pin 210 differs from the pin 10 in that the shoulder 240 has a greater diameter 242 and a lesser diameter 244 which bound opposite sides of a frustum 246 which diverges very gradually between the lesser diameter 244 and the greater diameter 242.

FIG. 12 reveals an alternative embodiment of the pin 10. The pin 310 differs from the pin 10 of the preferred embodiment in that the shoulder 340 diverges more quickly between a lesser diameter 344 and a greater diameter 342. A head 320 with facets 322, neck 330 and threaded shaft 350 are substantially similar to the pin 10.

FIG. 13 reveals an alternative embodiment of the pin 10. Pin 410 includes a head 420 with facets 422 similar to that exhibited by the pin 10. A neck 430 of the pin 410 is also similar to the neck 30 of the pin 10. A shoulder 440 of the pin 410 is optional, but shown in FIG. 13 in a form similar to a shoulder 340 exhibited by the pin 3 10. However, the threaded shaft 450 of the pin 410 is distinct from the threaded shaft 50 of the pin 10 in that the minor diameter 464 of the pin 410 is not constant, but rather decreases as it moves away from the head 420.

The minor diameter 464 thus diverges at an angle $\mu$ divergent from a parallel orientation as is exhibited by the pin 10. This diverging minor diameter 464 is mirrored by the major diameter 462 of the pin 410. In use and operation, the pin 410 is screwed into a hole H' having a complementally formed diverging major diameter A' and minor diameter B' within threads T'. Eventually the pin 410 reaches a point at which threads 460 abut against the threads T' in the hole H'.

This abutment prevents the pin 410 from further translation downward along central axis 402. Thus, further rotation of the pin 410 causes the first side D and second side E of the crack, upon which the hole H is located, to be drawn together. The neck 430 snaps the head 420 off when a sufficient torque is applied to the head 420, through the facets 422, to ensure that the threads 460 have effectively engaged the threads T' of the hole H'.

FIG. 14 reveals a cornered portion of the material M with a crack C therein. FIG. 14 schematically represents a possible orientation of the pin 410 which would draw a first side D and second side E of the crack C toward each other, thus repairing the crack C. This utilization of the pin 410 allows opposite sides of the crack C to be drawn together when no convenient flat surface S is provided for abutment with the shoulder 440.

Referring now to FIG. 15, an alternative embodiment of pin 10 is shown. The pin 610 is particularly designed for use in holes H" that are especially long, because a long crack C has formed in a thick material M. The pin 610 is similar to the pin 10 except that the pin 6 10 does not have a head, neck, or shoulder. Instead, the pin 610 has a top 652 with a torque tool receiver 620 therein. The pin 610 is screwed into the hole H" with the threads 660 engaging the threads T until the bottom 654 abuts against a bottom wall J of the hole H". This abutment prevents further translation of the pin 610 into the hole H". Further rotation of the pin 610 causes the threads 660 to draw the threads T and associated crack sides D, E toward each other.

A second pin 6 10 can then be screwed into the hole H" directly over the first pin 6 10. The second pin 610 will continue into the hole H" until its bottom 654 abuts with the top 652 of the first pin 610. This abutment allows the second pin 610 to draw sides D, E of the crack C together. In this way, long cracks C can be securely mended.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for cold repair of a crack in a material having a surface by forcing opposite sides of the crack together, the steps including:

drilling holes, each having a first diameter, through the surface and between opposite sides of the crack, tapping the holes with threads, the hole threads having a hole major diameter and a hole minor diameter, with a top portion of each hole thread adjacent to the hole major diameter closer to the surface than any other portion thereof, and threading pins into the holes formed in said drilling step, the pins each including a head and pin threads with a pin major diameter and a pin minor diameter with a top portion of each pin thread adjacent the pin major diameter closer to the head than any other part thereof;

whereby when a pin is threaded into a hole, pin threads engage hole threads, thereby forcing opposite sides of the crack toward each other.

2. The method of claim 1 wherein said threading step includes the steps of:

forming the pins to each have a shoulder of greater diameter than the first diameter of the holes created in said drilling step, the shoulder located between the threads and the head of the pins, wedging the shoulder of each pin into a respective hole to a depth beyond the surface of the material, resulting in the steps of:

causing the shoulder to impact sides of the hole, halting axial translation of the pin and forcing opposite sides of the crack toward each other.

3. The method of claim 2 wherein said drilling step includes the steps of identifying a precise orientation of the crack with respect to the surface, and drilling substantially cylindrical holes with a central axis of the holes oriented to pass along the crack between the opposite sides of the crack regardless of the holes perpendicularity to the surface.

4. The method of claim 3 wherein said threading step includes the step of forming the pins to each include a neck between the head and the shoulder, the neck having a torsional strength less than any other part of the pin, the neck having a torsional strength which is less than a torsional strength generated by a force great enough to cause damage to the pin threads;

whereby when the pins are utilized during said threading step, the heads shear off at the neck before a torsional load is applied to the pins sufficient to damage the pin threads or the hole threads, and grinding away any portions of the pins above the surface after said threading step.

5. The method of claim 4 wherein said drilling step includes the steps of defining an extent of the crack, and drilling holes at spaced intervals along the crack including holes which extend beyond two opposite ends of the crack.

6. The method of claim 5 wherein said drilling step includes the steps of drilling the holes in three stages, a first stage including drilling holes at opposite ends of the crack and at intervals therebetween with each hole closer to adjacent holes than a diameter of the holes, and thereafter threading pins into the holes, drilling second stage holes in every other space between the holes drilled in the first stage, and then threading pins into the holes of the second stage before additional holes are drilled to avoid any pins having untilled holes simultaneously existing adjacent both sides thereof, and drilling third stage holes into the remaining spaces between the holes drilled in the first stage and the second stage and threading pins into the holes formed in the third stage;

whereby the entire crack is drilled out by either the holes formed in the first stage, the holes formed in the second stage or the holes formed in the third stage while each of the pins is always threaded into a hole which is spaced from adjacent unfilled holes.

7. The method of claim 6 wherein said drilling step is preceded by the steps of forming a hole substantially transverse to the crack having a contour which conforms to a contour of a lock, the hole being slightly longer than a length of the lock, and driving the lock into the complementally formed hole;

whereby the crack is initially pulled together somewhat and supported before said drilling step.

8. The method of claim 7 wherein said tapping step includes forming the hole threads to have an upper surface extending between the hole minor diameter and the hole major diameter linearly at an angle between 10 degrees and 45 degrees divergent from a plane perpendicular to a central axis of the hole, and a lower surface extending between the hole minor diameter and the hole major diameter linearly at an angle between 20 degrees and 60 degrees to the plane perpendicular to the central axis, the lower surface angle being greater in magnitude than the upper surface angle, whereby a portion of each hole thread adjacent to the hole minor diameter is thicker than a portion of each hole thread adjacent to the hole major diameter.

9. The method of claim 1 wherein said drilling step forms holes having a greater diameter adjacent the surface than a diameter distant from the surface, and wherein said threading step includes threading pins into the holes which have a greater diameter adjacent the head thereof than a diameter distant from the head, whereby as the pin is threaded into the hole, the pin reaches a depth where pin threads abut against hole threads and thereafter cause opposite sides of the crack to be drawn together.

10. A method for drawing opposite sides of a crack in a material toward each other while maintaining a ductility of the material, including the steps of:

diagnosing an orientation of the crack with respect to a surface upon which the crack is exposed, forming a threaded cylindrical hole in the surface with a central axis of the hole co-planar with the crack orientation, the hole including threads having a hole major diameter and a hole minor diameter, with a top portion of each hole thread adjacent to the hole major diameter closer to the surface than any other portion thereof, providing a threaded pin having a threaded shaft with a diameter not greater than a diameter of the hole, a head and a shoulder above the threaded shaft and below the head, the shoulder having a diameter greater than the diameter of the hole, the pin including pin threads with a pin major diameter and a pin minor diameter with a top portion of each pin thread adjacent the pin major diameter closer to the head than any other part thereof, and threading the pin into the hole until the shoulder impacts the surface and the pin threads draw the hole threads on opposite sides of the crack toward each other.

11. The method of claim 10 wherein said providing step includes forming the shoulder to taper from a lesser diameter adjacent the threaded shaft to a greater diameter distant from the threaded shaft, said lesser diameter portion of said shoulder having a diameter similar to a diameter of the threaded shaft.

12. The method of claim 11 including the further step of continuing to thread the pin into the hole until the shoulder is driven below the surface of the material to a position impacting sides of the hole, causing additional drawing of opposite sides of the crack toward each other.

13. The method of claim 12 including the further step of grinding off portions of the pin above the surface.

14. The method of claim 13 including the further step of repeating the forming step at a location adjacent a previously formed hole after threading of a pin into the previously formed hole, threading additional pins into holes formed during said repeating step, and drawing additional portions of the crack closed.

15. The method of claim 14 wherein said continuing to thread the pin step includes the step of sealing the crack by driving the shoulder below the surface, whereby a pressure-resisting crack seal is provided.

16. A method for repairing a crack passing through a non-planar surface of a material, the steps including:

forming a threaded cylindrical hole in the surface with a central axis of the hole co-planar with the crack orientation and with two opposite sides of the crack forming two sides of the hole, the hole including threads having a hole major diameter and a hole minor diameter, with the top portion of each hole thread adjacent to the hole major diameter closer to the surface than any other portion thereof, providing a threaded pin having a threaded shaft with a diameter not greater than a diameter of the hole, a head, and a shoulder below the head and above the threaded shaft, the shoulder having a diameter which tapers from a lesser diameter adjacent the threaded shaft similar to a diameter of the threaded shaft to a greater diameter portion above the lesser diameter portion, the greater diameter portion having a diameter greater than the diameter of the hole, the pin including pin threads with a pin major diameter and a pin minor diameter with a top portion of each pin thread adjacent the pin major diameter closer to the head than any other part thereof, and threading the pin into the hole until the shoulder is drawn below the surface and impacts sides of the hole, thus halting pin translation into the hole and causing the pin threads to draw the hole threads on the opposite sides of the hole together.

17. The method of claim 16 including the further step of grinding away portions of the pins above the surface after the threading step.

18. The method of claim 17 wherein said threading step causes the crack to be pressure sealed by said shoulder impacting the sides of the hole.

* * * * *